United States Patent
Batusic et al.

(10) Patent No.: US 8,060,787 B2
(45) Date of Patent: Nov. 15, 2011

(54) SYSTEM AND METHOD FOR REDUCING CHRONIC TROUBLES

(75) Inventors: Frank Batusic, McCalla, AL (US); Russell B. Bellford, New Berlin, WI (US); Anthony Scott Dobbins, Rainbow City, AL (US); Steven H. Jordan, Birmingham, AL (US); Ken Keogh, Plantation, FL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 88 days.

(21) Appl. No.: 12/641,743

(22) Filed: Dec. 18, 2009

(65) Prior Publication Data

US 2011/0154129 A1 Jun. 23, 2011

(51) Int. Cl.
 *G06F 11/00* (2006.01)
(52) U.S. Cl. .................................. 714/37; 379/15.03

(58) Field of Classification Search .................. 714/4.1, 714/4.3, 5.1, 25–27, 30, 31, 37, 43, 44, 46, 714/47.2, 48, 56
See application file for complete search history.

(56) References Cited

U.S. PATENT DOCUMENTS

| | | | |
|---|---|---|---|
| 5,991,310 A * | 11/1999 | Katko | 370/522 |
| 6,870,899 B2 | 3/2005 | Lu et al. | |
| 6,990,479 B2 * | 1/2006 | Cha | 1/1 |
| 7,765,292 B2 * | 7/2010 | Sakaguchi et al. | 709/224 |

\* cited by examiner

*Primary Examiner* — Nadeem Iqbal
(74) *Attorney, Agent, or Firm* — Fay Kaplun & Marcin, LLP

(57) ABSTRACT

A system to reduce chronic troubles includes at least one interexchange point of presence for a network, an access loop, a central office, and a compiler. The access loop exchanges transmissions to at least one end device that is part of the network. The central office of the network is disposed between the at least one interexchange point of presence and the access loop. The compiler gathers performance management data related to the network at a taper code level. The compiler determines if a trouble associated with the network relates to the taper code level.

20 Claims, 2 Drawing Sheets

SYSTEM AND METHOD FOR REDUCING CHRONIC TROUBLES

BACKGROUND

A network may include a variety of configurations using different technologies. The network may include a backbone line from a central location to connect periphery locations, such as customers. Networks may experience chronic troubleshooting issues where a particular issue may arise on a continual basis. Conventional methods to resolve the issue may locate where the issue is arising. Furthermore, a high percentage of troubles may be access loop related. That is, multiple end point troubles may be attributed to a single issue. Conventional tools to resolve the issues may be capable of identifying a directionality of the trouble (e.g., if the trouble is originating from a copper access plant).

SUMMARY OF THE INVENTION

The exemplary embodiments of the present invention describes a system to reduce chronic troubles. The system comprises at least one interexchange point of presence for a network, an access loop, a central office, and a compiler. The access loop exchanges transmissions to at least one end device that is part of the network. The central office of the network is disposed between the at least one interexchange point of presence and the access loop. The compiler gathers performance management data related to the network at a taper code level. The compiler determines if a trouble associated with the network relates to the taper code level.

DETAILED DESCRIPTION

Figure 1:
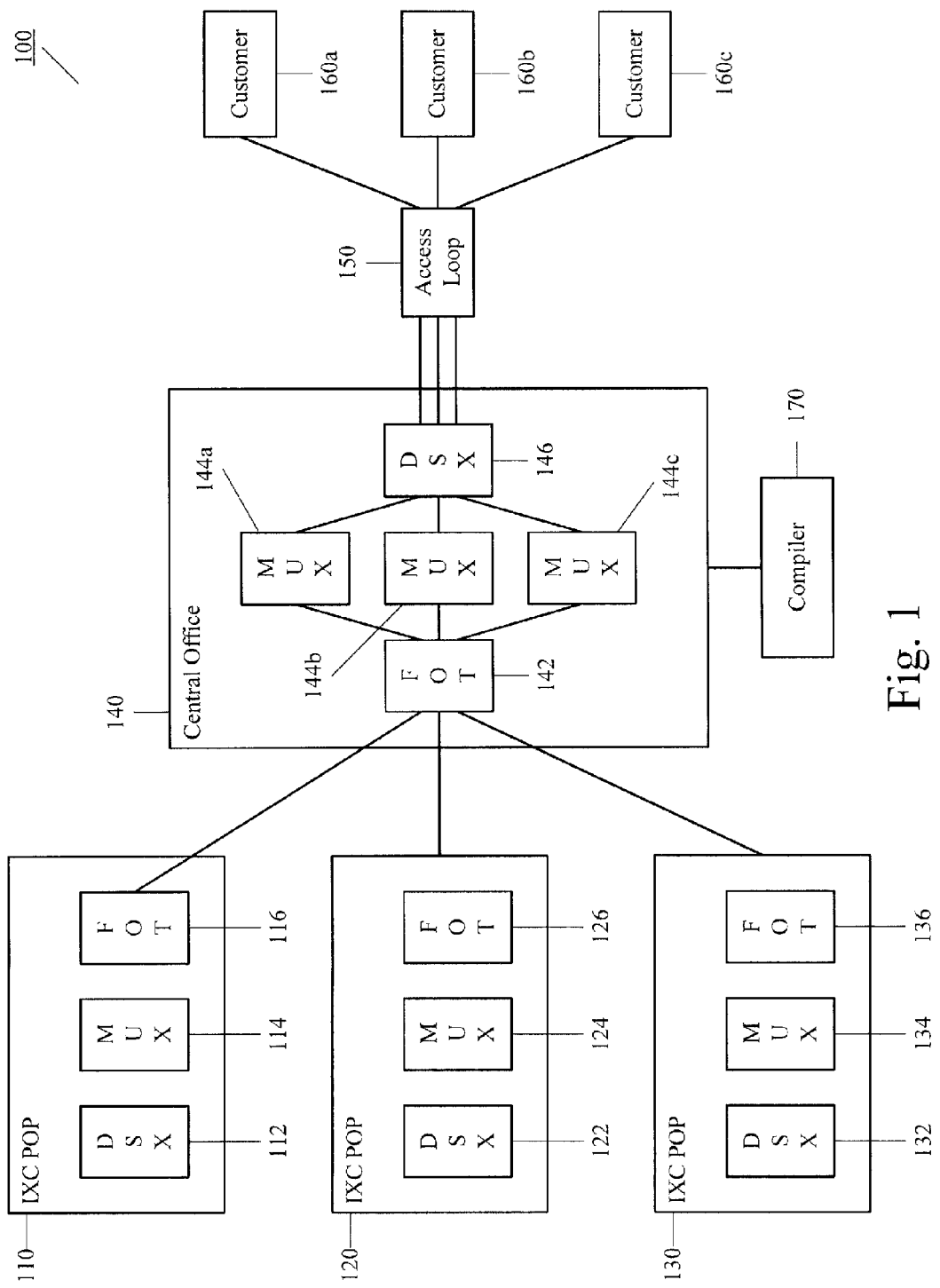
FIG. 1 shows a network configured to reduce chronic troubles according to an exemplary embodiment.

The exemplary embodiments may be further understood with reference to the following description and the appended drawings, wherein like elements are referred to with the same reference numerals. The exemplary embodiments describe a system and method for reducing chronic troubles related to trouble conditions in the networks. Specifically, the system and method may be configured to reduce the network related chronic troubles through an analysis at the taper code level. The exemplary embodiments may use proactive parametric data to accomplish the reduction in the network related chronic troubles. The network, the chronic troubles, the analysis, the taper code level, the parametric data, and a related method will be discussed in further detail below.

FIG. 1 shows a network 100 configured to reduce chronic troubles according to an exemplary embodiment. The network 100 may be configured for providing voice and/or data services to end devices that are used by a plurality of customers 160a-c. The network 100 may experience troubles associated with network components. The network 100 may include digital signalers (DSX) for the customers 160a-c and interexchange (IXC) point of presences (POPs) 110, 120, 130 located in the central office 140. Each IXC POP 110, 120, 130 may connect to the central office 140 via fiber cables. Each customer 160a-c may connect to the central office 140 via an access loop 150 via copper cables.

The customers 160a-c may represent any end device used in a variety of capabilities. For example, the customer 160a may be for a private residence in which the end device is a personal computer. In another example, the customer 160b may be a business in which the end device includes a plurality of computing devices that are capable of data (e.g., connecting to networks) and/or voice (e.g., VoIP).

The network 100 may include the access loop 150 as a connection from the customers 160a-c to the central office 140. The access loop 150 may provide conventional functionalities such as enabling the customers 160a-c to transmit data and/or voice to another device (e.g., customer 160a-c) via a switch. The access loop 150 may include a plurality of subscriber loops for each customer 160a-c where each subscriber loop consists of a twisted copper pair of wires. It should be noted that the network 100 may include further access loops for further customers. That is, the central office 140 may be configured to be connected to additional customers with a plurality of customers being part of an access loop which serves as the intermediary to the central office 140.

The central office 140 may be an intermediary disposed between the customers 160a-c and the IXC POPs 110, 120, 130. The central office 140 may include a frequency for optimum transmission device (FOT) 142, three multiplexers (MUX) 144a-c, and a DSX 146. The DSX 146 may be, for example, a DS1. The DS1 may provide conventional functionalities such as the standard for a T1 designator used in North America for providing a digital signaling rate of 1.544 Mb/sec. The FOT 142 may determine the highest effective frequency for transmission of radio waves via ionospheric reflection that is predicted to be usable for a specified path and time. The FOT 142 may consider, for example, the predicted use for 90% of the days for a month. The FOT 142 may often determine the frequency to be just below the maximum usable frequency (MUF) such as 15% below the monthly median value of the MUF for the specified path and time.

The MUXs 144a-c may be disposed between the FOT 142 and the DSX 146. The MUXs 144a-c may perform conventional functionalities such as receiving multiple inputs to be combined into an aggregate signal so that the signal is transmitted via a single transmission channel. Each of the MUXs 144a, b, c may correspond to the IXC POPs 110, 120, 130, respectively.

The IXC POPs 110, 120, 130 may also include a DSX, a MUX, and a FOT that perform substantially similar functionalities as the DSX 146, the MUXs 144a-c, and the FOT 142, respectively. Specifically, the IXC POP 110 may include a DSX 112, a MUX 114, and a FOT 116; the IXC POP 120 may include a DSX 122, a MUX 124, and a FOT 126; and the IXC POP 130 may include a DSX 132, a MUX 134, and a FOT 136. The IXC POPs 110, 120, 130 may perform conventional functionalities such as enabling a communications common carrier for providing telecommunications services between local access and transport areas (LATA) or between LATAs.

A compiler 170 may be disposed within the network 100 to receive parametric data relating to functionalities of the network 100. For example, the parametric data may include transmission rates between different components of the network at a variety of times during a day, a week, a month, a year, etc. As illustrated, the compiler 170 may be connected to the central office 140 (i.e., in an intermediary position) to receive the parametric data from all components of the network 100. However, it should be noted that the disposition of the compiler 170 as illustrated in FIG. 1 is only exemplary. In other exemplary embodiments, the compiler 170 may be disposed with other components of the network 100, multiple compilers 170 may be disposed at more than one component of the network 100, etc. In yet other exemplary embodiments, the compiler 170 may be incorporated with other components of the network 100.

Specifically, the compiler 170 may aggregate and prioritize performance management data at the taper code level. Because the performance management data is at the taper code level, the exemplary embodiments may be configured to identify cables performing poorly. For example, the fiber cables connecting the IXC POPS 110, 120, 130 to the central office 140 or the copper cables connecting the customers 160*a-c* to the access loop 150 and connecting to the central office 140 may be analyzed with the performance management data. The performance management data may be collected with predetermined time limits. For example, the performance management data of the network 100 may be stored historically for up to a year. This way, the exemplary embodiments may capture seasonal effects at the taper code level such as a decrease in performance during warmer seasons while experiencing an increase in performance during colder seasons or an increase in usage during various times of the year. The performance management data of the network may also be stored currently to identify cables with many T1's that may have errors.

The compiler 170 may further be configured to process the parametric data relating to the network 100. The parametric data may be stored in a database (not shown) that may be accessed to resolve any issues and/or troubles that have been reported. A processor (not shown) may be included with the compiler 170 that performs the processing of the parametric data. It should be noted that the processor that performs the processing of the parametric data may be part of other components of the network 100 such as the central office 140. That is, another processor in the network 100 with access to the parametric data may perform the processing while the compiler 170 is configured as a repository for the parametric data.

According to the exemplary embodiments, the compiler 170 may receive parametric data relating to the functionalities of the network 100. When trouble is reported regarding the network 100, the parametric data collected by the compiler 170 may be processed to determine an origin of the trouble. Conventionally, trouble may be accessed to identify a directionality of the trouble (e.g., if the problem is arising from a copper access plant). However, conventional tools lack the ability to aggregate poor performance to the cable or taper code level. According to the exemplary embodiments, the parametric data collected by the compiler 170 may indicate the source of the trouble at the cable or taper code level. For example, if the trouble relates to the access loop 150, through analysis of the parametric data, an origin of the trouble may no longer be determined to be at the customer location but at the access loop 150. The trouble may relate to, for example, old damaged copper loop plant (e.g., when a cable gets wet, trouble is caused while when the cable dries out, the cables have acceptable performance). The processor that processes the parametric data collected at the compiler 170 may determine the source of the trouble to be at the cable or taper code level with the additional data relating to the functionality. Thus, according to the exemplary embodiments, a proactive means for identifying poor performing cables may be had and valuable input may be provided to engineers who are assigned to fix the trouble.

The parametric data may also be used in a preventative manner. That is, when the parametric data relating to the functionalities of the network 100 are collected, the processor may analyze the performance of the network to determine potential issues that may arise. For example, the processor may have access to predetermined functionality parameters that are required at particular times of the day, week, month, year, etc. If the analysis of the parametric data determines that a steady decrease in performance is occurring when compared to the predetermined functionality parameters, a determination may be made that an issue is arising. The processor may further determine a potential source of the issue. For example, if each or a majority of the customers 160*a-c* are experiencing decreased performance, the processor may determine that the access loop 150 may be performing under expected parameters which indicates that the source of the issue may be at the access loop 150. Therefore, engineers assigned to address the issue may be aware that the access loop 150 may require replacing or fixing prior to trouble being received from at least one of the customers 160*a-c*.

Figure 2:
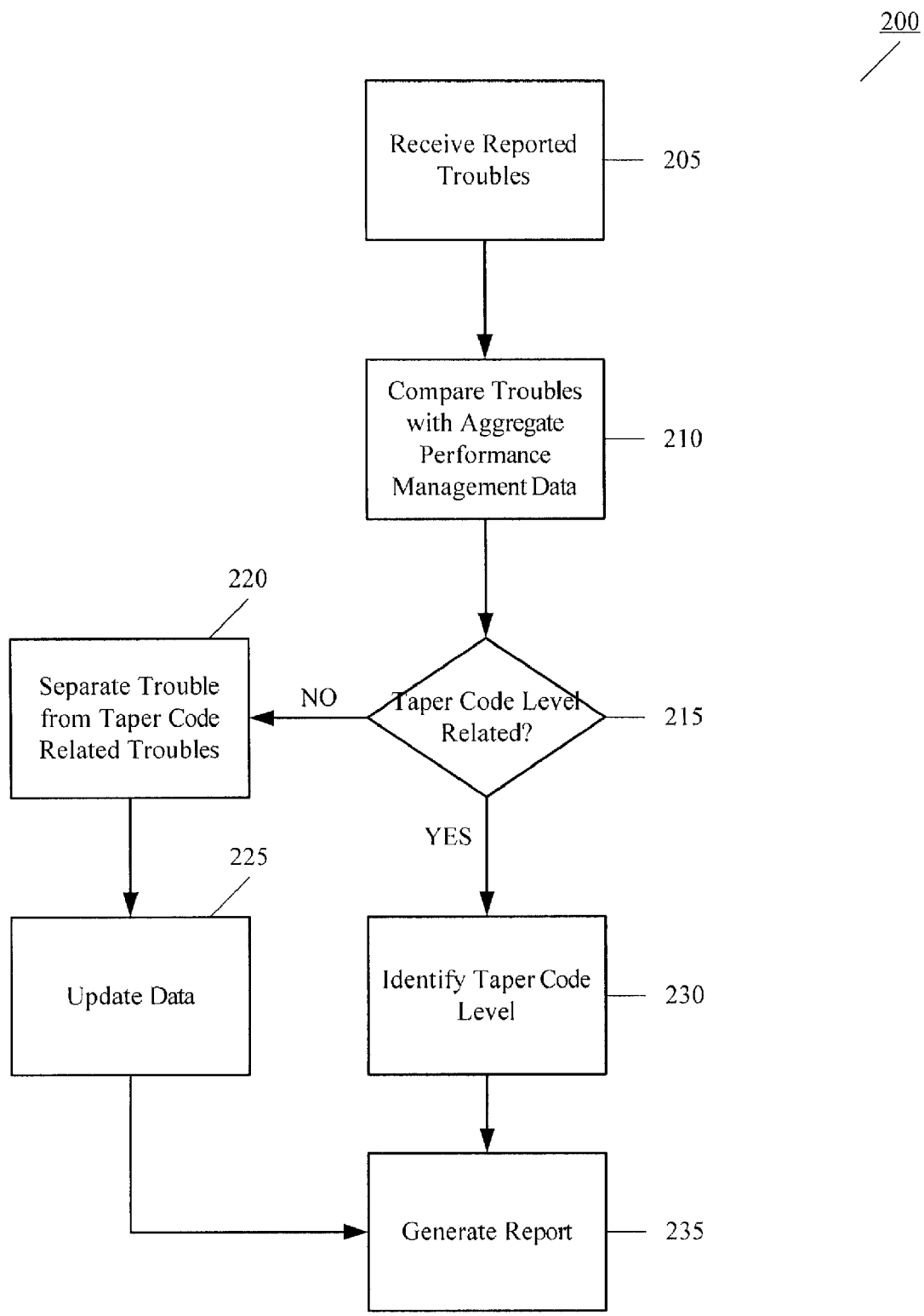
FIG. 2 shows a method for reducing chronic troubles according to an exemplary embodiment.

FIG. 2 shows a method 200 for reducing chronic troubles according to an exemplary embodiment. The method 200 may be used to address troubles that are reported. However, it should be noted that the exemplary embodiments and the method 200 may be used to address potential issues that may arise with the network 100. The method 200 will be described with reference to the network 100 of FIG. 1.

In step 205, the central office 140 may receive the troubles. The troubles may be problems relating to the network that already exist. For example, the trouble may relate to a down time in which one of the customers 160*a-c* does not have access to the network 100. In another example, the trouble may relate to sub-standard performance such as a transmission rate being below a predetermined rate that is guaranteed for the customers 160*a-c*. A user may report the troubles to a customer center or management center that addresses problems relating to the network 100. For example, the customer or management center may be located at the central office 140.

In step 210, the compiler 170 may compare the troubles to the aggregate performance management data that the compiler has collected. It should be noted that the troubles may be components associated therewith. For example, a trouble relating to down time may indicate a time frame in which service is not available as well as when exactly the down time was reported to have occurred. In another example, a trouble relating to a sub-standard transmission rate may indicate what the rate was, when and how long the rate was experienced, etc. In this manner, the processor may be able to perform an analysis with the performance management data and properly compare the parametric data appropriately.

In step 215, the compiler 170 may make a determination whether the trouble relates to the taper code level. The exemplary embodiments enable the compiler 170 to identify the troubles that are related to the taper code level and to generate a solution. However, when the troubles are related to a different level such as those related to troubles that are handled with conventional tools, conventional methods may be used.

Thus, if step 215 determines that the trouble is not related to the taper code level, the method 200 continues to step 220 where the compiler 170 separates the trouble from the taper code related troubles. In step 225, the compiler 170 may update the data relating to the troubles, in particular to indicate that the trouble is not taper code related so that appropriate action may be taken. A ticket to resolve the trouble may be sent out to engineers that handle non-taper code related troubles. For example, if only one of the customers 160*a-c* is experiencing an issue, then the trouble may be non-taper code related as the other customers are functioning properly.

If step 215 determines that the trouble is taper code related, then the method continues to step 230 where the compiler 170 identifies the taper code level. As discussed above, the exemplary embodiments may be configured to perform this very determination. The compiler 170 may receive the parametric data relating to the trouble to determine the taper code level that is causing the trouble to arise. For example, if more than one of the customers 160a-c are experiencing a common issue, then the compiler 170 may determine that the taper code level may be related to the access loop 150.

In step 235, the compiler 170 may generate a report to identify the troubles that have been reported and the compiler 170 may show a list of the troubles with respective details. Thus, a management center that handles troubles may dispatch appropriate engineers for each trouble or set of troubles (if related). This may also enable chronic troubles to be prevented as troubles related to a taper code level may resolve multiple issues being experienced. That is, if a trouble is related to the taper code level but to resolve the matter, an engineer attempts to resolve the issue at a different non-taper code related level, then the issue may arise again, chronically.

It should be noted that the method 200 may include additional steps in which the exemplary embodiments may further be configured to perform. For example, a step may be included between steps 230 and 235 as well as between steps 225 and 235 where the compiler 170 determines a potential solution to resolve the trouble. The comparison step 210 to determine whether the trouble is related to the taper code level may also generate resultant data that may be used by the processor to identify an exact source which is causing the trouble to arise. Using the exemplary embodiments (if the trouble is related to the taper code level) or conventional tools (if the trouble is not related to the taper code level), the compiler 170 may also provide further data to be included in the report (step 235) which indicates solutions for the troubles.

As discussed above, it should again be noted that the exemplary embodiments and the method 200 may address potential issues that may arise with the network 100. That is, the method 200 may not depend on receiving troubles to prevent chronic troubles from arising. The method 200 may be adjusted to prevent troubles from being received at all. For example, the method 200 may collect the aggregate performance management data at the compiler 170. The compiler 170 may continuously analyze the performance management data and compare any resultant data to predetermined functionality parameters. Thus, the adjusted method may include a step between steps 210 and 215 in which the compiler 170 identifies potential issues that may arise given the aggregate performance management data that has been collected. The adjusted method may then continue with steps 215-235.

According to the exemplary embodiments, chronic troubles experienced by a network may be reduced by identifying whether a trouble originates from an issue related to a taper code level. A compiler may collect performance management data that may relate to the taper code level which enables a processor to determine whether the trouble is related thereto. Thus, the exemplary embodiments may be configured to identify a solution for a trouble, in particular when the trouble relates to the taper code level. In this way, a proactive means is disclosed to prevent further similar troubles from recurring due to a problem with connections that may be missed or overlooked when the analysis tools are incapable of performing the proper determination.

Those skilled in the art will understand that the above described exemplary embodiments may be implemented in any number of manners, including as a separate software module, as a combination of hardware and software, etc. For example, the analysis (i.e., comparing and determining) module may be a program containing lines of code that, when compiled, may be executed on a processor of the compiler 170.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
   at least one interexchange point of presence (IXC POP) for a network;
   an access loop for exchanging transmissions to at least one end device that is part of the network;
   a central office of the network disposed between the at least one IXC POP and the access loop; and
   a compiler gathering performance management data related to the network at a taper code level, the compiler configured to determine if a trouble associated with the network relates to the taper code level.

2. The system of claim 1, wherein each of the at least one IXC POP includes a digital signaler (DSX), a multiplexer (MUX), and a frequency for optimum transmission (FOT) device.

3. The system of claim 1, wherein the central office includes a DSX, more than one MUX, and a FOT device.

4. The system of claim 1, wherein the compiler is a separate device that connects to at least one of the central office and the at least one IXC POP.

5. The system of claim 1, wherein the performance management data includes transmission rates at specified times of at least one of a day, a week, a month, a year, and a combination thereof.

6. The system of claim 1, wherein the performance data is stored historically that aggregates parametric data of the network for a predetermined time period.

7. The system of claim 1, wherein the performance data is stored currently that identifies transmission lines that potentially have errors.

8. The system of claim 1, wherein the trouble associated with the network relating to the taper code level relates to a parameter of cable performance.

9. The system of claim 1, wherein the compiler is further configured to determine a solution for the trouble associated with the network relating to the taper code level.

10. The system of claim 1, wherein the compiler generates a report indicating a specific taper code level in which the trouble is related.

11. A method, comprising:
    generating, by a compiler of a network, performance management data related to the network at a taper code level, the network including at least one interexchange point of presence (IXC POP), an access loop for exchanging transmissions to at least one end device that is part of the network, and a central office disposed between the at least one IXC POP and the access loop; and
    determining if a trouble associated with the network relates to the taper code level.

12. The method of claim 11, wherein each of the at least one IXC POP includes a digital signaler (DSX), a multiplexer (MUX), and a frequency for optimum transmission (FOT) device.

13. The method of claim 11, wherein the central office includes a DSX, more than one MUX, and a FOT device.

14. The method of claim 11, wherein the compiler is a separate device that connects to at least one of the central office and the at least one IXC POP.

15. The method of claim 11, wherein the performance management data includes transmission rates at specified times of at least one of a day, a week, a month, a year, and a combination thereof.

16. The method of claim 11, further comprising:
storing the performance data historically that aggregates parametric data of the network for a predetermined time period.

17. The method of claim 11, further comprising:
storing the performance data currently that identifies transmission lines that potentially have errors.

18. The method of claim 11, further comprising:
determining, by the compiler, a solution for the trouble associated with the network relating to the taper code level.

19. The method of claim 11, further comprising:
generating a report indicating a specific taper code level in which the trouble is related.

20. A computer readable storage medium including a set of instructions executable by a processor, the set of instructions operable to:
generate performance management data related to the network at a taper code level, the network including at least one interexchange point of presence (IXC POP), an access loop for exchanging transmissions to at least one end device that is part of the network, and a central office disposed between the at least one IXC POP and the access loop; and
determine if a trouble associated with the network relates to the taper code level.

* * * * *